United States Patent
Bobye

(10) Patent No.: US 9,791,575 B2
(45) Date of Patent: Oct. 17, 2017

(54) GNSS AND INERTIAL NAVIGATION SYSTEM UTILIZING RELATIVE YAW AS AN OBSERVABLE FOR AN INS FILTER

(71) Applicant: NovAtel Inc., Calgary (CA)

(72) Inventor: Michael Bobye, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 0 days.

(21) Appl. No.: 15/007,866

(22) Filed: Jan. 27, 2016

(65) Prior Publication Data

US 2017/0212248 A1 Jul. 27, 2017

(51) Int. Cl.
*G01S 19/47* (2010.01)
*G01C 21/18* (2006.01)
*G01S 19/53* (2010.01)
*B62D 6/00* (2006.01)

(52) U.S. Cl.
CPC ............. *G01S 19/47* (2013.01); *B62D 6/003* (2013.01); *G01C 21/18* (2013.01); *G01S 19/53* (2013.01)

(58) Field of Classification Search
CPC ......... G01S 19/47; G01S 19/53; B62D 6/003; G01C 21/18
USPC ........ 701/472, 493, 500; 342/357.23, 357.48
See application file for complete search history.

(56) References Cited

U.S. PATENT DOCUMENTS

| | | | |
|---|---|---|---|
| 5,543,804 A * | 8/1996 | Buchler | G01S 19/54 342/357.23 |
| 6,005,514 A | 12/1999 | Lightsey | |
| 6,278,945 B1 * | 8/2001 | Lin | G01C 21/165 701/472 |
| 6,593,879 B1 | 7/2003 | Cambell | |
| 6,611,228 B2 * | 8/2003 | Toda | G01S 19/55 342/357.38 |
| 6,721,657 B2 | 4/2004 | Ford et al. | |
| 6,754,584 B2 * | 6/2004 | Pinto | G01C 21/165 342/357.48 |
| 7,123,187 B2 | 10/2006 | Deimert et al. | |
| 7,193,559 B2 * | 3/2007 | Ford | G01C 21/165 342/357.32 |
| 7,702,460 B2 * | 4/2010 | Liu | G01C 21/165 342/357.31 |
| 8,130,142 B2 * | 3/2012 | Zietz | G01S 19/35 342/357.36 |
| 8,577,607 B2 | 11/2013 | Williamson | |

(Continued)

OTHER PUBLICATIONS

International Search Report and Written Opinion mailed Jan. 9, 2017 for International Application No. PCT/CA2016/051161 international filing date Oct. 6, 2016 for NovAtel Inc., 9 pages.

(Continued)

*Primary Examiner* — Tan Q Nguyen
(74) *Attorney, Agent, or Firm* — Cesari and McKenna, LLP; Omar M. Wadhwa

(57) ABSTRACT

A GNSS/INS navigation system includes an INS filter that uses relative yaw values as an observable for attitude updates. The system calculates the relative yaw values based on carrier phase measurements, e.g., phase windup measurements, of GNSS signals received at a system GNSS antenna. The use of the relative yaw values as an observable in the INS filter allows the system to improve estimates of associated biases, and also to continue to estimate the associated biases in low dynamic environments.

20 Claims, 2 Drawing Sheets

(56) References Cited

U.S. PATENT DOCUMENTS

2008/0269988 A1  10/2008  Feller et al.
2012/0065883 A1   3/2012  Williamson

OTHER PUBLICATIONS

Ford, et al., "Beeline RT20—a Compact, Medium Precision Positioning System With an Attitude", Proceedings, 1997, Institute of Navigation Conference 1997, Kansas City, Missouri, 9 pages.

* cited by examiner

GNSS AND INERTIAL NAVIGATION SYSTEM UTILIZING RELATIVE YAW AS AN OBSERVABLE FOR AN INS FILTER

BACKGROUND OF THE INVENTION

Field of the Invention

The invention relates generally to navigation systems and, more particularly, to navigation systems that incorporate inertial and GNSS subsystems.

Background Information

Inertial/GNSS receivers, such as the receivers described in U.S. Pat. Nos. 6,721,657 and 7,193,559, which are assigned to a common assignee and incorporated herein by reference, work well to provide accurate and uninterrupted navigation information, even in environments in which sufficient numbers of GNSS satellites are not continuously in view. As is described in the patents, the inertial/GNSS receivers utilize inertial measurements to fill-in whenever the GNSS subsystem does not receive GNSS satellite signals from a sufficient number of GNSS satellites to determine position. Further, the inertial/GNSS receivers combine, in real time, information from the GNSS and inertial subsystems to aid in signal re-acquisition and in the resolution of associated carrier ambiguities when a sufficient number of GNSS satellite signals are again available.

The inertial/GNSS receivers initialize inertial and GNSS subsystems at start-up and the inertial/GNSS receiver can then operate in steady state navigation mode to provide accurate and uninterrupted navigation information to a user. The inertial subsystem must typically experience dynamic motion both during and after start-up in order for the inertial/GNSS receivers to accurately calculate the navigation information utilizing a combination of inertial measurements, GNSS observables, and GNSS position and covariance information.

The inertial sub-system includes an inertial measurement unit (IMU), which reads data from orthogonally positioned accelerometers and gyroscopes. As is known, the accelerometers and gyroscopes have associated biases that introduce errors into the IMU data if not corrected. The inertial sub-system thus incorporates GNSS position, covariance and, as appropriate GNSS observables in an INS filter to estimate the IMU errors required to correct the INS measurements.

The gyroscopes in the IMU, particularly in a relatively low cost IMU, tend to have very large biases that can drift quickly when left un-aided. Accordingly, the uncorrected gyroscope measurements can cause inaccurate heading or attitude information, which will introduce errors into the calculations of position and velocity. Known prior systems utilize course over ground measurements or, alternatively, absolute orientation, which is determined in a known manner using signals from multiple GNSS antennas, to provide updated heading information. The system uses the updated heading information with RTK in a known manner to correct for carrier phase errors caused by, for example, phase windup. The GNSS/INS system then uses the corrected carrier phase to determine improved position and velocity, and provides the improved position and velocity to the IMU in order to constrain IMU device drift.

The two techniques for determining the updated heading information for the correction of the carrier phase errors typically introduce other errors into the position and velocity calculations. The errors, which are generally associated with unknown crab angles and a dependence on motion, must then be handled by the system in order for the system to calculate accurate position and velocity information using the IMU sensors.

SUMMARY OF THE INVENTION

A GNSS/INS navigation system includes an INS filter that uses relative yaw values as an observable for attitude updates. The system calculates the relative yaw values based on carrier phase measurements, e.g., phase windup measurements, of GNSS signals received at a system GNSS antenna. The use of the relative yaw values as an observable in the INS filter allows the system to improve estimates of associated biases, and also to continue to estimate the associated biases in low dynamic environments.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
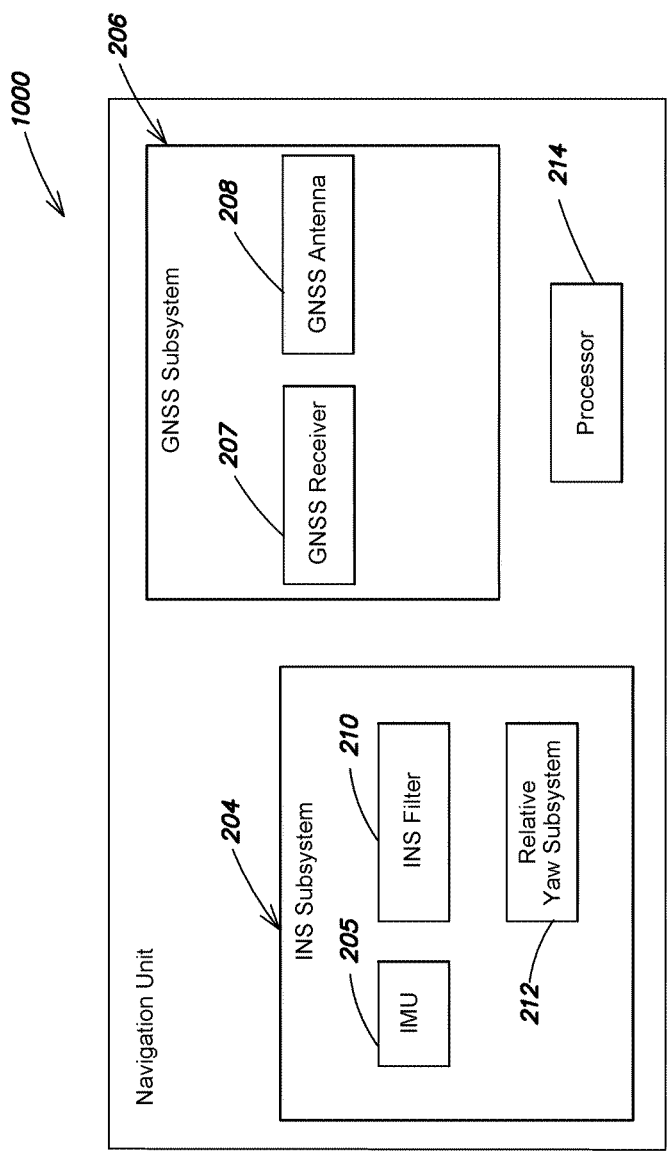
FIG. 1 is a functional block diagram of a navigation system constructed in accordance with the invention.

Referring to FIG. 1, a navigation unit 1000 for use with moving vehicles includes a GNSS subsystem 206 with a GNSS receiver 207 and an associated GNSS antenna 208, an inertial navigation system (INS) subsystem 204 with an inertial measurement unit (IMU) 205 and an INS filter 210, and a relative yaw subsystem 212 that provides relative yaw values as an observable to the INS filter 210. As discussed in more detail below, the relative yaw subsystem 212 calculates relative yaw values by computing phase windup measurements from two or more circularly polarized GNSS signals received by the antenna 208 from a given GNSS satellite. The relative yaw subsystem may use the technique discussed in U.S. Pat. No. 7,123,187 which is owned by a common Assignee and incorporated herein in its entirely by reference, to determine the relative yaw values. The calculated relative yaw values are then used in the INS filter as an observable for the updating of the system attitude.

The respective subsystems operate under the control of a processor 214, which processes measurements, observables, and so forth, provided by the subsystems and produces navigation information that is provided to the user.

In steady state mode, the GNSS subsystem 206 processes the GNSS satellite signals received over the GNSS antenna 208 and operates in a known manner to make GNSS measurements, determine GNSS position and time, and maintain position covariance values. As appropriate, the GNSS subsystem may also determine GNSS observables, such as carrier phase (also known as accumulated Doppler range). At the same time, the relative yaw subsystem 212 determines relative yaw values by processing carrier phase measurements from at least two GNSS signals that are received from the same transmitting source, such as, for example, L1 and L2 signals received from a given GNSS satellite or L1 and L5 signals received from the given GNSS satellite. If more than one GNSS satellite is in view, the relative yaw subsystem may process carrier phase measurements from the respective signals transmitted by additional GNSS satellites to determine the relative yaw values.

The IMU 205 reads data from orthogonally positioned accelerometers and gyroscopes (not shown) and provides the data to the INS subsystem, which processes the data to produce measurements. The INS subsystem incorporates the GNSS measurements, position and covariance and, as appropriate, GNSS observables, provided by the GNSS subsystem and the relative yaw observable provided by the relative yaw subsystem in an INS filter that is used to process the INS measurements. INS-based position, velocity and attitude are then determined using an INS filter process, for example a Kalman filter process, and a mechanization process, as discussed below.

After processing, the navigation unit 1000 provides navigation information, such as position, velocity and/or attitude, to the user through, for example, an attached display device (not shown). Alternatively, or in addition, the navigation unit may provide the navigation information to a vehicle steering mechanism that controls the movements of vehicle (not shown). As discussed in more detail below, the relative yaw observable for the attitude update to the INS filter allows the system to continue to estimate gyroscope biases in meaningful manner and thus contain the inertial attitude values even in time of low dynamic movement, such as during U-turns.

We now discuss the operations of the navigation unit 1000 to initialize the INS and GNSS subsystems in more detail. For ease of understanding, we discuss the processing operations of the navigation unit subsystems without specific reference to the processor 214. The system may instead include dedicated GNSS, INS, and relative yaw sub-processors, which communicate with one another at appropriate times to exchange information that is required to perform the various GNSS, INS and relative yaw observable calculation operations discussed below. For example, the INS sub-processor and the relative yaw sub-processor communicate with the GNSS sub-processor when IMU data and relative yaw data are provided to the respective sub-processors, in order to time-tag the data with GNSS time. Further, the GNSS sub-processor communicates with the INS sub-processor to provide the GNSS observables and GNSS measurements, position and covariance at the start of each measurement interval, and so forth.

At start-up, the GPS subsystem 206 operates in a known manner to acquire the signals from at least a minimum number of GPS satellites and calculate pseudoranges to the respective satellites and associated Doppler rates. Based on the pseudoranges, the GPS sub-system determines its position relative to the satellites. The GPS subsystem 206 may also determine its position relative to a fixed-position base receiver (not shown), either through the use of differential correction measurements generated at the base station or after resolving associated carrier cycle ambiguities.

At the same time, the INS subsystem 204 processes the IMU data, that is, the measurements from the various accelerometers and gyroscopes (not shown), to determine the initial attitude and velocity of the GNSS receiver 207. The relative yaw subsystem 212 also processes carrier phase measurements and determines relative yaw values that are observables to attitude update operations. The INS subsystem 204 further processes both the IMU data, the GPS position and associated covariance information, GPS observables and the relative yaw observable, to set up various matrices for the INS filter. At the start of each measurement interval, the INS subsystem 204 updates the INS Kalman filter and provides updated error states to a mechanization process. The mechanization process uses the updated information and the IMU data to propagate, over the measurement interval, the inertial current position, attitude and velocity related information, with the associated inertial position and velocity errors being controlled by the GPS position and GPS observables at the start of the measurement intervals and the inertial attitude being controlled by the relative yaw observable.

The INS subsystem 204 determines the orientation of a reference, or body, frame for the accelerometer and gyroscope measurements. The INS subsystem 204 calculates the initial attitude represented as Euler angles relating the body frame to the ECEF frame. Accordingly, the y-axis of the measurement reference frame must not be aligned with the gravity vector.

To set the orientation of the reference frame such that the y-axis does not align with the gravity vector, the INS subsystem 204 compares the measurements from the various accelerometers, which are nominally assigned to x, y and z axes, to determine which measurement is largest in magnitude. The INS subsystem 204 then re-assigns or maps the x, y and z axes among the accelerometers such that the z-axis has the largest positive acceleration magnitude, that is, such that the z-axis points up. The INS subsystem 204 will then properly estimate the initial attitude, regardless of how the receiver is oriented.

To produce the navigation information, the navigation unit 1000 performs two main processes, the mechanization of the raw IMU data into a trajectory (a time series of position, velocity and attitude) and the correction of that trajectory with updates estimated by the GNSS/INS integration process, which is an extended Kalman filter. The Kalman filter used for the INS integration contains state variables representing the errors of the system being modeled, which are position, velocity, attitude, IMU sensor errors, and optionally the offset vector (or lever arm) from the IMU to GNSS antenna. The mechanization occurs at the rate of the IMU data (typically delta velocity and angular increments) at a relatively high rate, usually 100 Hz or higher. The Kalman filter runs at a lower rate, for example at 1 Hz, such that errors in the INS trajectory accumulate to become clearly observable when compared to the update information provided by the GNSS subsystem 206 and the relative yaw subsystem 212. Further, the lower rate tends to keep the updates sufficiently separated in time to eliminate (or at least mitigate) time correlated errors on the update measurements.

To initialize the mechanization process, starting point values for attitude, position and velocity are required. The position must be supplied from a source that is external to the IMU. The velocity can either be supplied from an external source, or assumed to be zero based on analysis of the raw accelerometer and gyroscope measurements. The attitude may also be supplied from an external source or, depending on the quality of the IMU sensors, the attitude can be solved for using an analytical coarse alignment where the measured acceleration and angular rotation values are used with knowledge of the earth's rotation direction and magnitude and the earth's gravity vector and the position of the IMU, to compute the rotations between the IMU body frame and the local level frame or the ECEF frame. During the analytical coarse alignment, however, the IMU must remain stationary.

From the initial position, velocity and attitude values, the mechanization process integrates the raw gyroscope and accelerometer measurements into a position, velocity and attitude time series. This trajectory is the system for which errors are estimated by the extended Kalman filter.

The extended Kalman filter also requires initialization. The Kalman filter is based on a state space model that defines the relationships between the states with a first order differential equation.

$$\dot{x} = Fx + Gw$$

where F is the dynamics matrix that defines the differential equation relating the states to the their time derivative, w is the noise associated with the process, and G is a matrix that acts as a shaping filter to distribute the noise across the states.

The solution to this set of differential equations in the discrete domain is:

$$x_k = \phi_{k,k-1} x_{k-1} + w_k$$

where $\phi_{k,k-1} = e^{F\Delta t}$, which is typically approximated in a first order linearization as $\phi_{k,k-1} \cong 1 + F\Delta t$, $W_k$ is the noise associated with the state space model, and $\phi$ is the transition matrix that defines the interactions between the states in the discrete Kalman filter processes. Because of the relationships between states, directly observing one state allows the filter to estimate other states that are not directly observed but have a linkage to the directly observed error state.

To begin the Kalman filter process, initial variances are required for each state, to form the state covariance matrix P. The initial variances for the Kalman filter states are the same as the variances of the initial values for position, velocity and attitude used in the mechanization process, and the expected magnitude of the IMU sensor errors. Process noise values, which are indicative of uncertainties in the state space model, are also required to start the Kalman filter process.

The Kalman filter is propagated between update measurements. Thus, the values for the states and their variances are propagated forward in time based on how they are known to behave as defined in the transition matrix. When an update measurement is available, the states can be observed and the observations are then utilized to update the gain and covariance matrices and P and the state vector x.

Basically, the update measurement is an external measure of the state values, while the Kalman filter propagation provides the assumed state values based on the model. The update measurement does not need to directly observe states. It can indirectly observe states if a model can be made to combine the states into the domain of the measurement:

$$z_k = H_k x_k$$

where z is a function of the states and H is the design matrix. The variable $\hat{z}_k$ used in the update is the absolute measurement made, while $z_k$ is the value computed by the observation model and the current state estimates $x_k$.

The Kalman filter process is defined by propagation equations:

$$P_k^- = \phi_{k,k-1} P^- \phi_{k,k-1}^T + Q_k$$

$$x_k^- = \phi_{k,k-1} x_{k-1}^+$$

where Q is a matrix that represents the time propagation of the spectral densities of the state elements, and update equations:

$$K_k = P_k^- H_k^T [H_k P_k^- H_h^T + R_k]^{-1}$$

$$\hat{x}_k^+ = \hat{x}_k^- + K_k(\hat{z}_k - H_k \hat{x}_k^-)$$

$$P_k^+ = [I - K_k H_k] P_k^-$$

where $R_k$ is the measurement variance matrix for the absolute measurements and K is the gain matrix.

The propagation step can happen as often as the user would like updated state and variance estimates based on the state space model. The update step can happen whenever an external aiding measurement is available. In an INS integration filter it is typical to run the propagation step to precede the update step, because the mechanization process is providing the full system values (i.e. position, velocity, and attitude) at a high rate (i.e. >100 Hz) allowing the errors described in the Kalman filter's state vector to accumulate. The errors are thus well observed in the update measurement, which happens at a lower rate (i.e. 1 Hz). After every update, the estimated state vector is used to correct the mechanized trajectory (and update IMU sensor error estimates), and then set to zero, because once the error estimates have been applied to the trajectory, all known error has been removed from the system.

In the update process, the gain matrix, K, is formed as a combination of the design matrix, H, the state variance matrix P, and the update measurement variance matrix R. The design matrix defines how the states are combined to create the observation equation, and this determines the observability of the states through the update. The state and measurement variance matrices control how much a state can be corrected by the update, that is, they control the overall gains for each state. For example, if the measurement has a much larger variance than the state variance, even if the design matrix indicates that the measurement has strong observability, the correction to the states will be minimized, via a small gain value, because the filter knowledge of the state is stronger than the measurement. As different update measurements are applied in the filter, with different design matrices and varying measurement qualities, the Kalman filter state estimates begin to converge. This convergence is indicated in the state variance matrix, P, as it is updated with the gain matrix and design matrix of the update measurements.

While the Kalman filter provides estimates of the state immediately upon initialization, the variance of those states will remain large until they are observed through updating, which essentially validates or corrects the state values predicted by the state space model. If a state is not well observed through the update process, the Kalman filter cannot produce a high quality (low variance) estimate of it, and this will result in larger propagated variances for any other state that has the poorly observed state as a constituent, which will make the filter more likely to allow low quality measurement updates to strongly correct the state estimates. For the Kalman filter to be stable, all of its states should be well observed with variances of equivalent magnitudes. This also provides the user of the overall navigation system with good quality trajectory estimates. Additionally, good quality, low variance estimates of the states minimizes the errors in the mechanized trajectory, so that longer periods between update measurements can be better tolerated—that is the error in the INS trajectory will be less over a given integration time if the IMU sensor error estimates are accurate.

In the navigation system 1000, the update measurements are position measurements derived from the GNSS signals, and may also include the GNSS raw measurements like pseudoranges, carrier phases and Doppler velocity measurements, and relative yaw values derived by the relative yaw subsystem from the phase wind up values that are based on the carrier phase measurements.

The differences between the GNSS position and INS position are considered as direct observations of the position error state variables. Further, because the state space model defines the position error as the integral of the velocity error, a position update also observes the velocity error states. The state space model defines the velocity errors as a combination of accelerometer errors, attitude errors as they manifest as incorrect removal of gravity accelerations from each accelerometer axis, errors in the assumed gravity value, as well as position and velocity errors as they manifest in the incorrect removal of earth's rotation effects from the accelerometer measurements.

A position update to the Kalman filter provides a very indirect measurement of the attitude errors, while the relative yaw observations allow for a direct observation of the attitude error states. Over repeated update epochs, the variance of the attitude errors states will thus decrease much more rapidly than it would have with only position updates, or other update measurements whose observation equations are in the position or velocity domain only. Accordingly, using the attitude information based on the calculated relative yaw, the INS subsystem can relatively quickly determine altitude error states with low variances. This is true even in low-dynamic environments.

In contrast to IMU sensors and, the relative yaw subsystem does not have to rely on the system moving dynamically to provide relative yaw values from which changes in orientation information and associated IMU element biases can be accurately estimated. Accordingly, filter and mechanization process can accurately determine updated INS attitude with or without dynamic motion, and the navigation unit can therefore operate to more accurately determine updated attitude while, in the example, the vehicle is making U-turns or performing other low dynamic maneuvers. Such a determination in low dynamic situations may be critical to determining when, for example, a vehicle may start to accelerate in a new desired direction.

If GNSS position is not then available from the GNSS subsystem, e.g., if the GNSS antenna 208 does not receive signals from a sufficient number of satellites, the INS Kalman filter does not perform an update. The propagated covariance matrix then reflects that no GNSS related position is available. The inertial position, which is based on the inertial measurements and the available GNSS observables, assuming at least one GNSS satellite is in view, is then used as the navigation unit position at the start of the next one second measurement cycle. If, however, the system is stationary when the GNSS position information is not available, the navigation unit saves the state of the system and the INS Kalman filter and operates in a known manner to perform a zero velocity update, also referred to as a ZUPT in the incorporated patents, and the navigation unit 1000 then uses the interpolated inertial position as the navigation unit position at the start of the next measurement cycle. The relative yaw observable may be used to determine updated attitude when at least one GNSS satellite is in view, and thus, changes in attitude may be determined even if the system is in a low dynamic motion environment.

The mechanization process combines the initial conditions determined during alignment with the IMU data, to keep the INS sub-system parameters current. Thereafter, the mechanization process uses the conditions associated with the ending boundary of the previous IMU measurement interval, and propagates the INS sub-system parameters, that is, current position, velocity and attitude, from the end boundary of the previous IMU measurement interval to the end boundary of the current IMU measurement interval.

For the INS processing, the IMU 205 provides the inertial measurements to the INS subsystem 204 and also produces a pulse that coincides with the first byte of the information. The pulse interrupts the processor 214, which provides the GNSS time from a GNSS clock (not shown) to the INS subsystem. The INS subsystem, in turn, time tags the inertial measurements with the GNSS time. The inertial position based on the measurement data is thus time synchronized to a GNSS position. A similar arrangement occurs to time tag the relative yaw information, such that the relative attitude observable is time synchronized to a GNSS position.

As discussed, the relative yaw subsystem determines an observable for use in the INS filter that allows the system to continue to estimate gyroscope biases in a meaningful manner, even in low dynamic environments. The relative yaw subsystem can determine the observable using at least two signals received from a single source by a single GNSS antenna. Further, the system may determine the relative yaw observable whenever at least one GNSS satellite is in view. Accordingly, the relative yaw subsystem provides an attitude observable to the INS filter at times when GNSS position information may not be available from the GNSS subsystem because too few GNSS satellites are currently in view. Thus, when the system is relying on INS information for navigation, the system uses the relative yaw observable provided by the relative yaw subsystem to provide more reliable updated attitude information.

Figure 2:
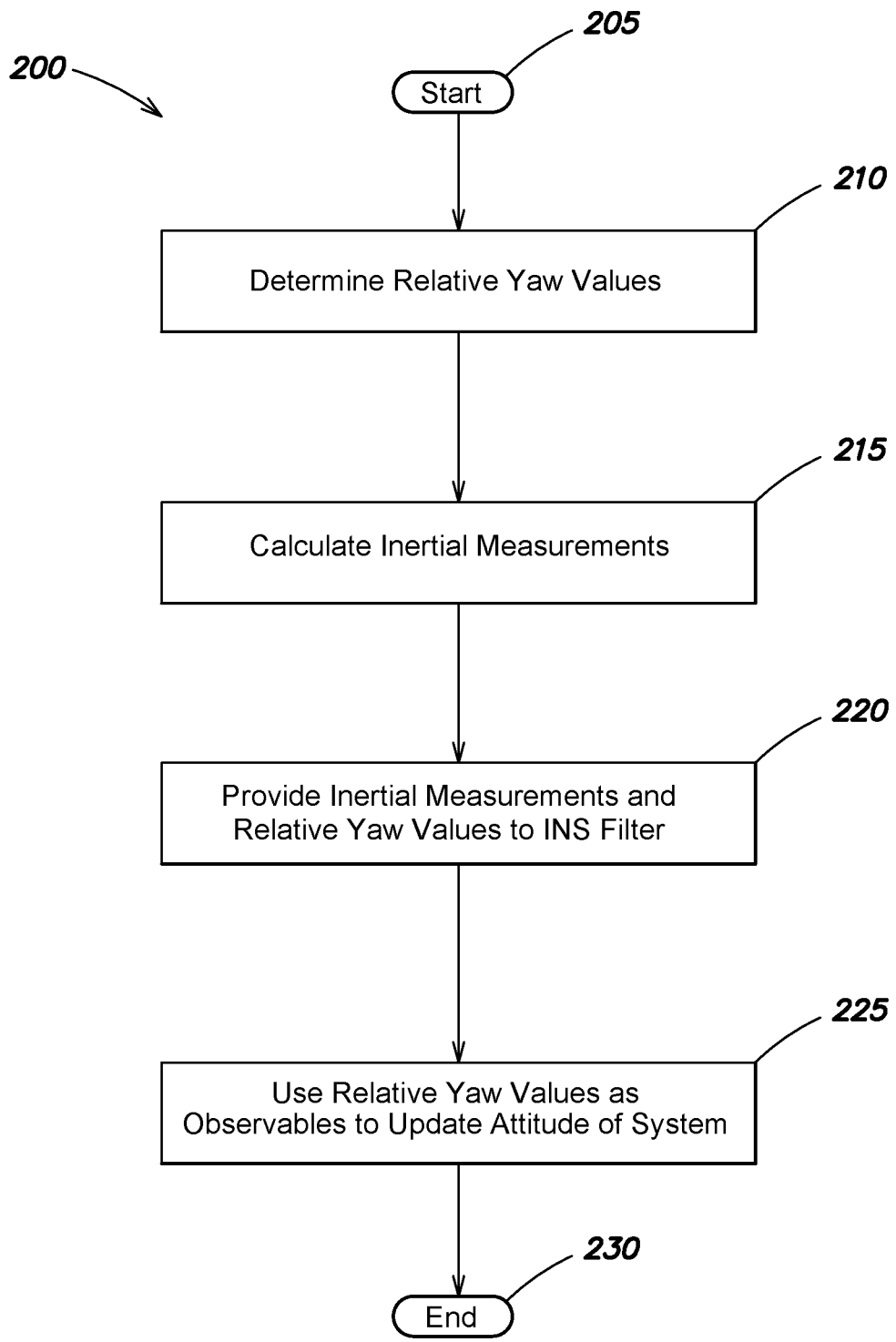
FIG. 2 is a flow chart of operations performed by the navigation system of FIG. 1 utilizing calculated relative yaw values in an INS filter as an observable for updating attitude.

FIG. 2 is a flow chart of the operations of the system utilizing calculated relative yaw values in an INS filter as an observable for updating attitude. The procedure 200 starts at step 205 and continues to step 210, where the system determines relative yaw values. Specifically, the relative yaw subsystem 212 of the INS subsystem, determines the relative yaw values from the phase wind up values that are based on the carrier phase measurements. For example, the technique discussed in U.S. Pat. No. 7,123,187, which is owned by a common Assignee and incorporated herein in its entirely by reference, may be utilized to determine the relative yaw values. It is expressly contemplated that the relative yaw values may be determined in any of a variety of ways as known by those skilled in the art.

At step 215, the system operating in a known manner calculates inertial measurements. Specifically, the IMU 205 reads data from orthogonally positioned accelerometers and gyroscopes (not shown) and provides the data to the INS subsystem 204, which processes the data to produce the inertial measurements that include, for example, at least attitude information associated with the INS/GNSS navigation system.

At step 220, the inertial measurements and the relative yaw values are provided to an INS filter of the INS subsystem. For example, the INS filter may be a Kalman filter, or a similar filter, as known by those skilled in the art. It is noted that additional information may be provided to the INS filter. For example, a GNSS subsystem of the INS/GNSS navigation system operating in a known manner may processes GNSS satellite signals received over the GNSS antenna 208 to make GNSS measurements, determine GNSS position and time, and maintain position covariance values. As appropriate, the GNSS subsystem may also determine GNSS observables, such as, for example, accumulated Doppler range. The GNSS position, covariance information, and GNSS observables may be also be provided to the INS filter.

At step 225 the relative yaw values are used by the INS filter as observables for updating the attitude of the INS/GNSS navigation system. Notably, the relative yaw values provide an attitude observable to the INS filter when at least one GNSS satellite is in view, that is, even at times when, for example, GNSS position information may not be available from the GNSS subsystem because too few GNSS satellites are currently in view. In addition, the INS filter may utilize the GNSS position, covariance information, and GNSS observables provided by the GNSS subsystem with the INS measurements to determine INS-based updated position, velocity, and attitude values, with the system utilizing the relative yaw values as the observable for the updated attitude. At step 230, the procedure ends.

The foregoing description described certain example embodiments. It will be apparent, however, that other variations and modifications may be made to the described embodiments, with the attainment of some or all of their advantages. For example, although reference is made to determining the relative yaw values utilizing the technique as described in U.S. Pat. No. 7,123,187 which is commonly owned, it is expressly contemplated that any of a variety of techniques may be utilized to determine the relative yaw values, as known by those skilled in the art. Further, it is expressly contemplated that processors 214 may be included within any of the subsystem of the INS, such as the relative yaw subsystem 212, the GNSS subsystem, etc. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. An inertial navigation system (INS)/global navigation satellite system (GNSS) navigation system comprising
   a GNSS subsystem including a GNSS receiver and a GNSS antenna,
   an INS subsystem including an inertial measurement unit and an INS filter, and
   a relative yaw subsystem configured to calculate relative yaw values based on phase windup measurements of GNSS satellite signals received by the GNSS antenna, the relative yaw subsystem providing the relative yaw values to the INS subsystem
   the INS subsystem operating the INS filter to determine an updated attitude based on using inertial measurements of the inertial measurement unit and the relative yaw values as an observable of the updated attitude.

2. The INS/GNSS navigation system of claim 1, wherein the INS subsystem uses the relative yaw values to aid in estimating biases associated with the inertial measurement unit.

3. The INS/GNSS navigation system of claim 2, wherein the inertial measurement unit includes gyroscopes and the relative yaw values are utilized to estimate gyroscope biases.

4. The INS/GNSS navigation system of 1, wherein
   the INS/GNSS navigation system time tags the inertial measurements and the relative yaw values, and
   the INS subsystem utilizes position and orientation related information associated with corresponding time tags.

5. The INS/GNSS navigation system of claim 4, wherein the time tags are GNSS time.

6. The INS/GNSS navigation system of claim 1 wherein the INS filter is a Kalman filter and the Kalman filter utilizes update measurements associated with orientation information and the corresponding relative yaw values.

7. The INS/GNSS navigation system of claim 1 wherein the navigation system provides navigation information to a vehicle steering device.

8. The INS/GNSS navigation system of claim 1 wherein the navigation system operates in a steady state navigation mode with or without a GNSS position determined by the GNSS subsystem when the calculated relative yaw values are available.

9. The INS/GNSS navigation system of claim 1 wherein the INS subsystem utilizes attitude updates determined from the relative yaw values to provide an observation of an attitude error state of the INS subsystem.

10. The INS/GNSS navigation system of claim 1 wherein the INS subsystem utilizes attitude updates determined using the relative yaw values over multiple measurement cycles to reduce an associated variance.

11. An inertial navigation system (INS) subsystem of an INS/global navigation satellite system (GNSS) navigation system, the INS comprising:
    a relative yaw subsystem configured to calculate relative yaw values based on phase windup measurements of GNSS signals received at an antenna of the INS/GNSS navigation system;
    an inertial measurement unit (IMU) configured to read data associated with acceleration and orientation of the INS/GNSS navigation system, wherein the data is utilized to produce measurements that include at least an attitude of the INS/GNSS navigation system; and
    an INS filter configured to update the attitude of the INS/GNSS navigation system using the relative yaw values as observables.

12. The INS subsystem of claim 11, wherein the INS subsystem is configured to receive GNSS position, covariance information, and GNSS observables from a GNSS subsystem of the INS/GNSS navigation system.

13. The INS subsystem of claim 12, wherein the INS filter is further configured to utilize the measurements, relative yaw values, the GNSS position, the covariance information, and the GNSS observables to determine INS-based position, velocity, and attitude.

14. The INS subsystem of claim 11, wherein the INS subsystem uses the relative yaw values to aid in estimating biases associated with the measurements produced by the IMU.

15. The INS subsystem of claim 14, wherein the IMU is further configured to estimate gyroscope biases, associated with one or more gyroscopes of the IMU, utilizing the relative yaw values.

16. The INS subsystem of claim 11, wherein the measurements and the relative yaw values are time tagged, and wherein the INS subsystem is configured to utilize position and orientation information associated with corresponding time tags.

17. A method, comprising:
    calculating, by a relative yaw subsystem of an inertial navigation system (INS) subsystem of an INS/global navigation satellite system (GNSS) navigation system, relative yaw values based on phase windup measurements of GNSS signals received at an antenna of the INS/GNSS navigation system;
    reading, by an inertial measurement unit (IMU), data associated with acceleration and orientation of the INS/GNSS navigation system, wherein the data is utilized to produce measurements that include at least an attitude of the INS/GNSS navigation system; and
    updating, by an INS filter, the attitude of the INS/GNSS navigation system using the relative yaw values as observables.

18. The method of claim 17, further comprising receiving, by the INS subsystem, GNSS position, covariance information, and GNSS observables from a GNSS subsystem of the INS/GNSS navigation system.

19. The method of claim 18, further comprising utilizing, by the INS filter, the measurements, the relative yaw values, the GNSS position, the covariance information, and the GNSS observables to determine INS-based position, velocity, and attitude.

20. The method of claim 17, further comprising utilizing the relative yaw values to aid in estimating biases associated with the measurements produced by the IMU.

* * * * *